United States Patent [19]

Spoto et al.

[11] Patent Number: 5,539,869
[45] Date of Patent: Jul. 23, 1996

[54] METHOD AND SYSTEM FOR PROCESSING AND PRESENTING ON-LINE, MULTIMEDIA INFORMATION IN A TREE STRUCTURE

[75] Inventors: Thomas A. Spoto, Birmingham, Mich.; Hiroshi Higashide, Ishikawa Prefecture, Japan; James S. Rankin, II, Farmington Hills, Mich.

[73] Assignee: Ford Motor Company, Dearborn, Mich.

[21] Appl. No.: 953,034

[22] Filed: Sep. 28, 1992

[51] Int. Cl.⁶ .................................................. G06T 1/00
[52] U.S. Cl. .......................... 395/154; 395/159; 395/161; 364/424.03
[58] Field of Search .................................. 395/154, 155, 395/159–160, 145, 144, 147, 600, 161; 364/401, 413.02, 424.03; 434/322, 323, 327, 365

[56] References Cited

U.S. PATENT DOCUMENTS

| | | | |
|---|---|---|---|
| 4,656,603 | 4/1987 | Dunn | 364/900 |
| 4,710,763 | 12/1987 | Franke et al. | 340/723 |
| 4,813,013 | 3/1989 | Dunn | 364/900 |
| 4,893,256 | 1/1990 | Rutherfoord et al. | 364/518 |
| 4,902,469 | 2/1990 | Watson et al. | 376/259 |
| 4,931,950 | 6/1990 | Isle et al. | 364/513 |
| 4,945,476 | 7/1990 | Bodick et al. | 364/413.02 |
| 4,954,964 | 9/1990 | Singh | 364/513 |
| 4,954,969 | 9/1990 | Tsumura | 364/513 |
| 5,021,976 | 6/1991 | Wexelblat et al. | 364/521 |
| 5,025,395 | 6/1991 | Nose et al. | 364/518 |
| 5,257,185 | 10/1993 | Farley et al. | 364/419.19 |
| 5,267,865 | 12/1993 | Lee et al. | 434/350 |
| 5,295,230 | 3/1994 | Kung | 395/75 |
| 5,297,150 | 3/1994 | Clark | 371/19 |
| 5,317,732 | 5/1994 | Gerlach, Jr. et al. | 395/600 |
| 5,420,977 | 5/1995 | Sztipanovits et al. | 395/160 |

OTHER PUBLICATIONS

"The Relationship Between Multimedia And Expert Systems", by John P. Coyne, Multimedia Review, Summer 1991, pp. 13–16.

*Primary Examiner*—Mark K. Zimmerman
*Assistant Examiner*—Joseph H. Feild
*Attorney, Agent, or Firm*—Joseph W. Malleck; Roger L. May

[57] ABSTRACT

Method and system are provided for processing and presenting on-line, multimedia information such as diagnostic information for a machine tool. The system uses multimedia information tools (i.e. graphics, documentation, drawings, photographs, full motion video with audio, PLC ladder, etc.) and techniques to assist maintenance personnel. Diagnostic development and multimedia information assignment are accomplished through graphical visual programming, which requires no conventional software programming efforts. The system uses diagnostic trees having multimedia graphic icons which define the diagnostic components. In developing a visual diagnostic tree, the multimedia information can be assigned or mapped to each node of the tree by selecting an appropriate icon to represent the multimedia from an icon library. Then, an appropriate media information file or record and comments for that icon are further added to define that node assignments. The system is user friendly, uses conventional hardware and can be used on the plant floor. The system is immediately executable and is generic. The method and system can also be used for training, process planning, marketing, sales, help desk applications, other machine diagnostics, and engineering design.

36 Claims, 11 Drawing Sheets

METHOD AND SYSTEM FOR PROCESSING AND PRESENTING ON-LINE, MULTIMEDIA INFORMATION IN A TREE STRUCTURE

CROSS-REFERENCE TO RELATED APPLICATION

This application relates to U.S. patent application U.S. Ser. No. 07/952,211 entitled "Method And System For Diagnosing Machines" filed on the same day as this application, having the same assignee, and which is hereby expressly incorporated in its entirety by reference.

TECHNICAL FIELD

This invention relates to methods and systems for processing and presenting multimedia information and, in particular, to methods and systems for processing and presenting on-line, multimedia information such as diagnostic information for a machine tool in a tree structure.

BACKGROUND ART

There exists a need for timely delivery of diagnostic information for machine tools such as stamping presses. As illustrated in FIG. 1, the need is the greatest when the press is first delivered. As time passes, the plant personnel become more experienced and less dependent on a diagnostic system. The key is continually to have the proper tools present to minimize press down time, regardless of the need.

Based on these observations, the machine tool manufacturer must develop the diagnostic aid as the press is being designed if this goal is going to be achieved.

Current expert systems and/or artificial intelligence technology tools can not meet the above direction, goals and design needs. The deficiency is in the ability to allow end users to build and maintain diagnostics, especially as the plant machinery goes through modification. Based on the current state of software/hardware technology (i.e. object oriented), there exists a need for a new method and system which uses this technology in a novel way for capturing, preserving and delivering machine tool diagnostic and support information.

The U.S. patent to Isle et al. (U.S. Pat. No. 4,931,950) discloses a multimedia interface method for a knowledge-based diagnostic system. The knowledge-based system stores multimedia commands to control multimedia outputs for presenting information to users.

The U.S. patent to Tsumura (U.S. Pat. No. 4,954,969) discloses a system for processing multimedia information in a easily usable form.

The U.S. patent to Singh (U.S. Pat. No. 4,954,964) discloses an apparatus and method for expert analysis of metal failure with automated visual aid. The invention combines an expert system with a video or photographic display system.

The U.S. patent to Rutherfoord et al. (U.S. Pat. No. 4,893,256) discloses an interactive multimedia presentation system and a method for developing the presentation.

The U.S. patent to Bodick et al. (U.S. Pat. No. 4,945,476) discloses a knowledge-base system with stored pictorial images for use in medical diagnostic environments.

The prior art discloses the use of icons in various systems. For example, the U.S. patent to Nose et al. (U.S. Pat. No. 5,025,395) discloses a data processing system which employs icons to represent various functions of the system.

The U.S. patent to Wexelblat et al. (U.S. Pat. No. 5,021,976) discloses a method and system for generating dynamic, interactive visual representations of information structures. The patent teaches the use of iconic representations in an information system.

The U.S. patents to Dunn (U.S. Pat. Nos. 4,656,603 and 4,813,013) disclose interactive rule based systems employing icons. The system generates and stores a specific set of rules pertaining to the use of each icon.

The paper entitled "The Relationship Between Multimedia And Expert Systems" by John Coyne, discloses a philosophy to using an expert system and multimedia but fails to provide many details.

The U.S. patent to Franke et al. (U.S. Pat. No. 4,710,763) discloses a method of constructing and developing a tree structure. An operator is capable of performing editing and evaluating functions on the tree.

The U.S. patent to Watson et al. (U.S. Pat. No. 4,902,469) discloses apparatus for producing a discrete state display including status trees and status tree node operations.

SUMMARY OF THE INVENTION

An object of the present invention is to provide a method and system for processing and presenting on-line, multimedia information in a tree structure.

Another object of the present invention is to provide a relatively simple and flexible method and system for processing and presenting on-line, multimedia information such as diagnostic information for a machine tool wherein initial diagnostic knowledge and documentation (such as drawings) are electronically captured as designers are designing the machine tool, which eliminates any possible loss or re-engineering of this information at a later time.

In carrying out the above objects and other objects of the invention, a method for processing and presenting multimedia information in a tree structure including branches having a plurality of nodes and node-connecting links in a computer system having a tree display for displaying nodes of the tree structure is disclosed. The method includes the step of providing a command display for displaying multimedia commands representative of various types of multimedia information. The method also includes the step of providing a multimedia output which provides multimedia information to a user of the system. The method further includes the step of providing a knowledge base for storing a multiplicity of information records mapped into the tree structure. The information records include means for denoting the text strings that can be displayed on the tree display, means for denoting the multimedia commands that can be displayed on the command display, and means for denoting the multimedia information that can be presented by the multimedia output. In response to a received initial command, at least one selected node of the tree structure is displayed including at least one text string on the tree display. A plurality of multimedia commands corresponding to the at least one selected node is displayed on the command display. After a user command related to one of the displayed multimedia commands is received, a selected amount of the multimedia information is delivered to the multimedia output in response thereto for presentation to the user of the system.

A system is also provided for carrying out each of the above method steps.

Preferably, the multimedia commands are displayed on the command display in the form of graphic icons.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
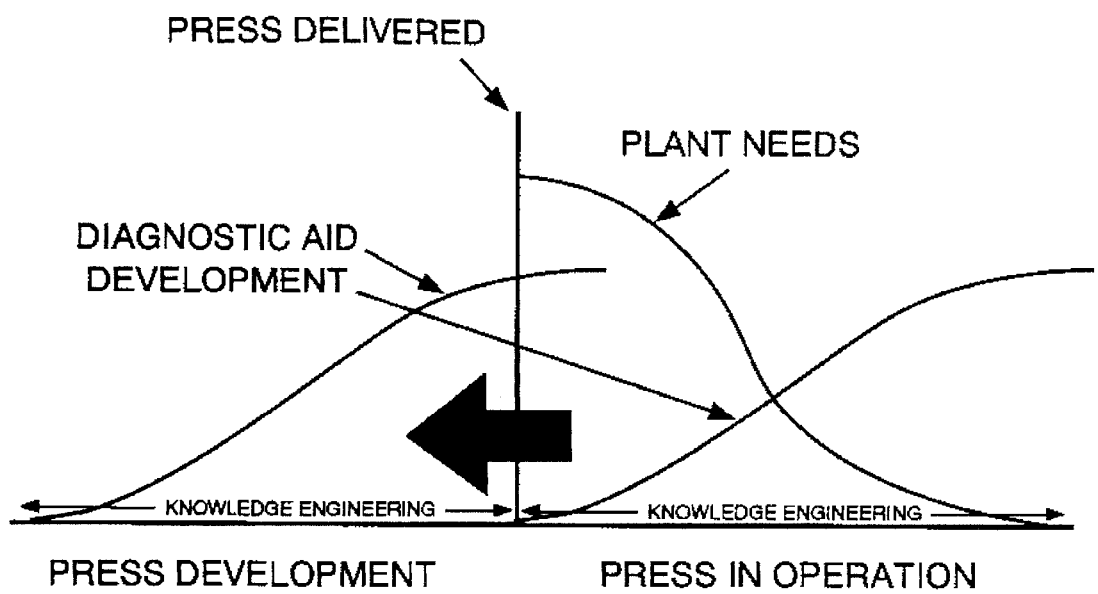
FIG. 1 is a graph illustrating the interrelationship of the need for diagnostic information to press development time and press operational time.
Figure 2:
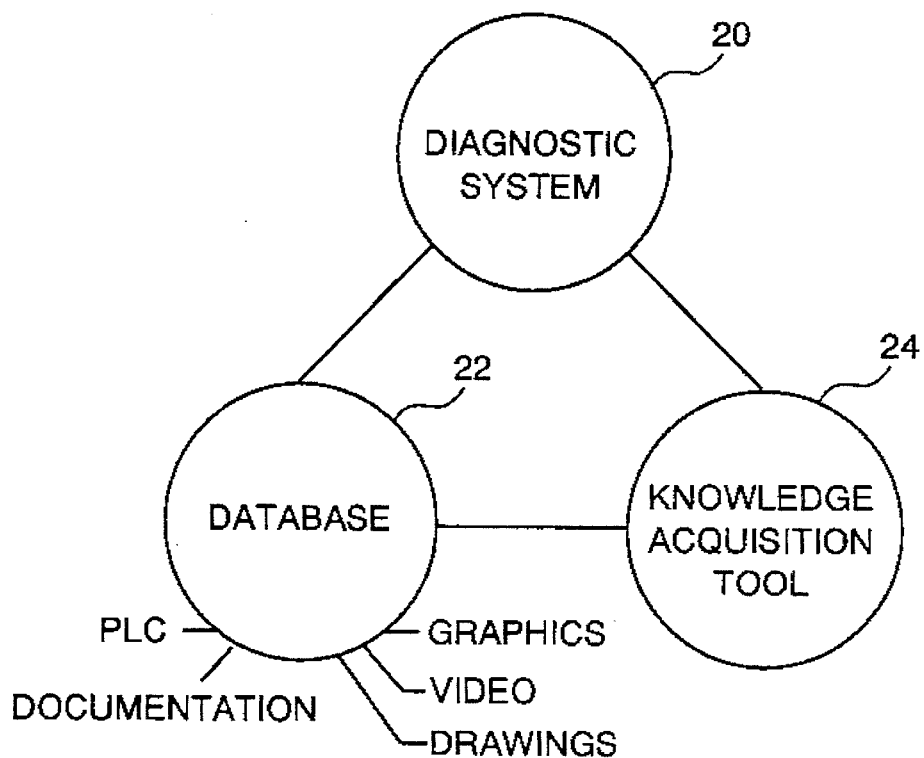
FIG. 2 is a schematic diagram illustrating the architecture of the system of the present invention including a diagnostic system coupled to a database of machine-specific knowledge and support information.

Referring now to the drawing figures, there is schematically illustrated in FIG. 2 a system including a generic core of software and hardware, which is referred to below as a diagnostic system 20 for use with a machine tool such as a press. To give life to the diagnostic system 20 for a unique machine tool diagnostic solution requires specific machine tool diagnostic knowledge and support information (referred to below as a database 22).

The architecture of the system illustrated in FIG. 2, shows three primary components of the system: the diagnostic system 20, a knowledge acquisition tool 24, and the database 22.

The diagnostic system 20 is dependent on the data to enable it as an application. The data in the database 22 includes machine tool specific diagnostic knowledge and support information (i.e. drawings and video) which is stored in the form of information records. The machine tool support information provides alternative methods of communication and documentation necessary to properly inform the end user while doing his or her job. Another important aspect of this architecture is that the machine specific support information can be stored in its original format (for example, Wordperfect). There is no need to translate or re-engineer the information, thus reducing development time, expense and effort.

The knowledge acquisition tool 24 of the present invention is relatively simple and intuitive to use; provides graphical representation of diagnostics knowledge; and provides mapping of machine tool related support information.

Figure 3:
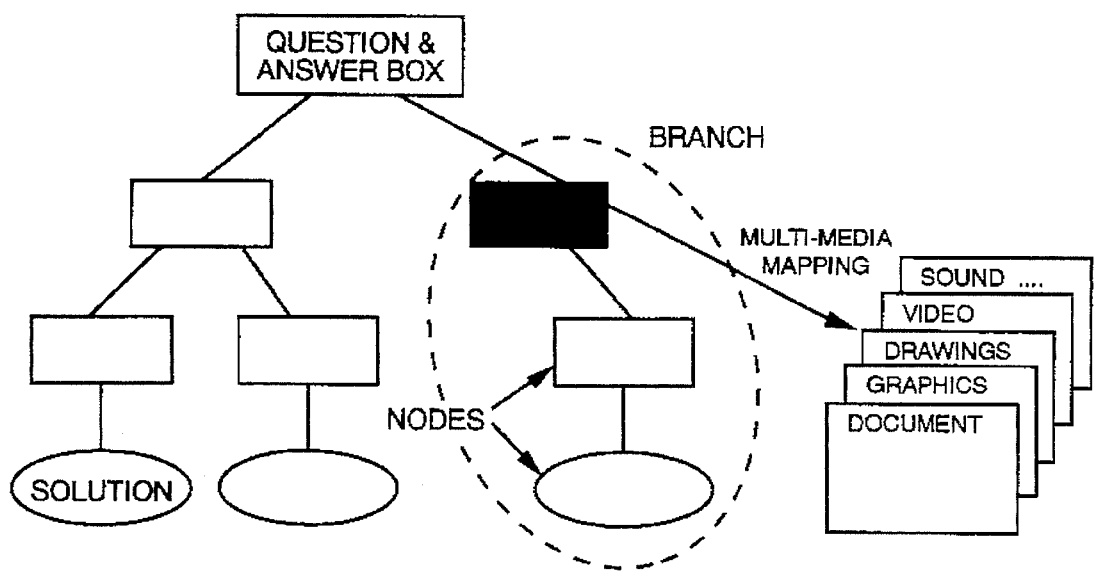
FIG. 3 is a schematic diagram of a diagnostic tree and multimedia mapping of the present invention.

The tool 24 represents the knowledge in graphical trees (or diagnostic trees). Within a tree there are several questions and answers, and solution nodes as illustrated in FIG. 3. Nodes can be grouped together into branches, making the diagnostic tree more modular and reusable. There is no software programming involved in building the trees or mapping the support knowledge—it is performed through graphical visual programming. Training to use of the diagnostic tool can be accomplished relatively quickly.

The procedure is similar to using a computer drawing package, by graphically selecting and placing objects (denoted by boxes), asserting text (questions & answers), linking boxes and assigning support information to respective nodes as illustrated in FIG. 3. Training to build and maintain diagnostic trees, and assign or edit machine specific support information can also be accomplished relatively quickly.

The method and system of the present invention preferably utilizes an IBM PC platform that operates under DOS 5.0 and Windows 3.0. This platform provides a rich design environment and option flexibility.

Figure 4:
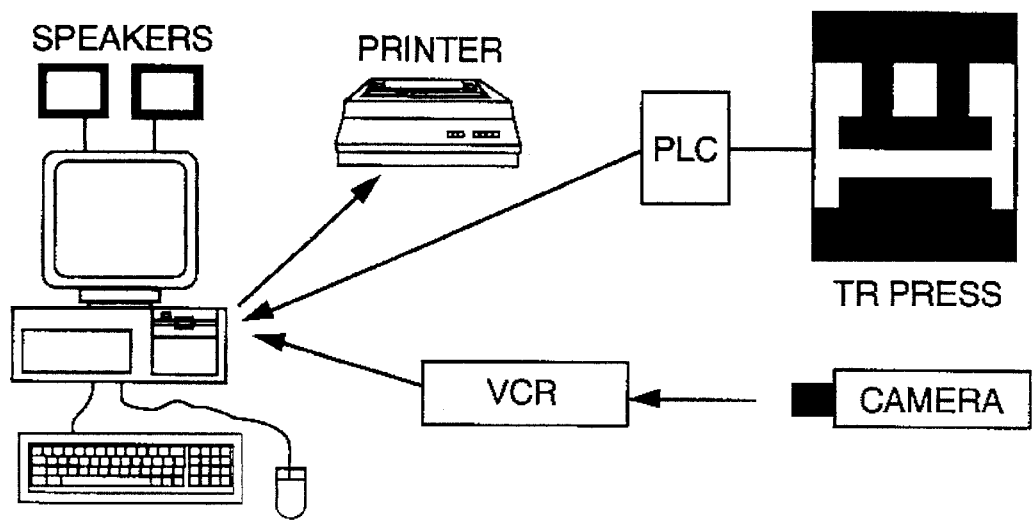
FIG. 4 is a schematic view of the hardware of the system.

The target system preferably includes, at a minimum, an IBM 386/486 or compatible computer with a 200 Mb hard drive, 8 Mb of RAM, VGA display, Video card, a computer controlled VCR, optional speakers, and a direct connection to a press PLC network as illustrated in FIG. 4.

Figure 5:
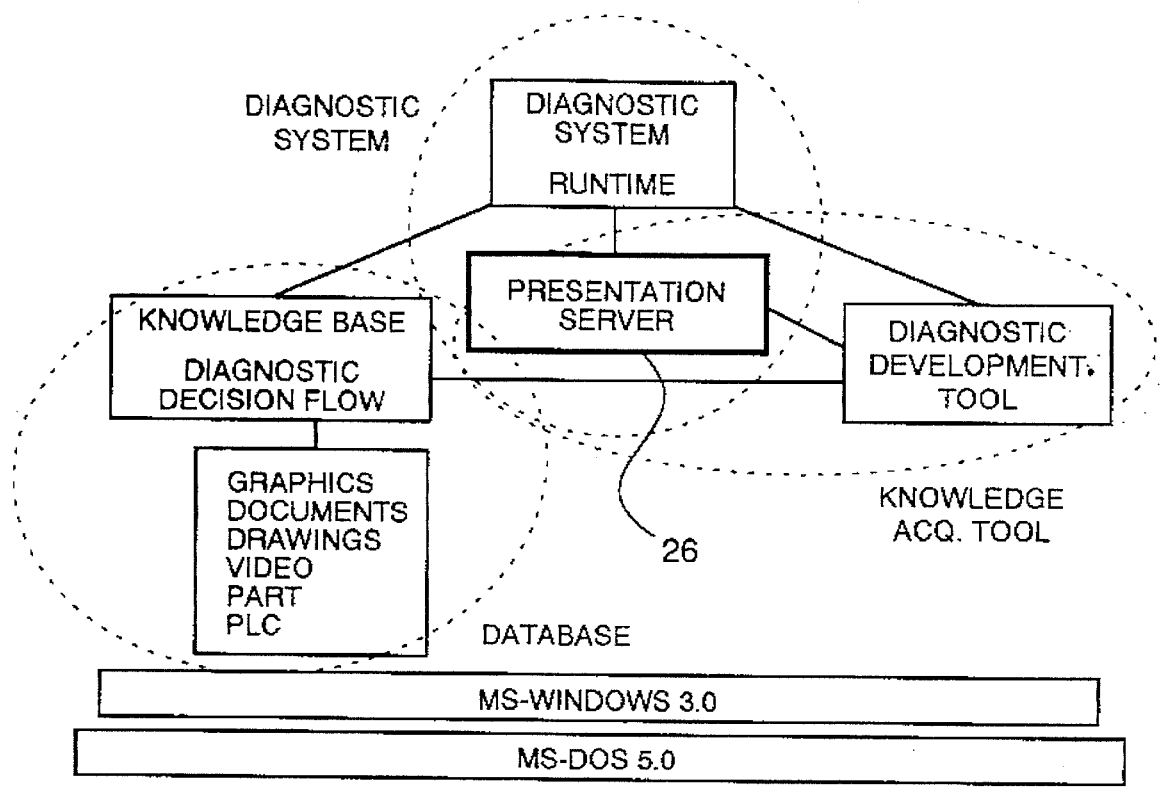
FIG. 5 is a schematic view of the software of the system.

There is illustrated in FIG. 5, a software portion of the system. The software includes commercially available software and one custom piece of software called a presentation server 26. The Windows 3.0 environment allows multiple software package to run concurrently and communicate between themselves. Communication between the software packages leverages the software packages functionality into a integrated solution and minimizes software development.

Figure 6:
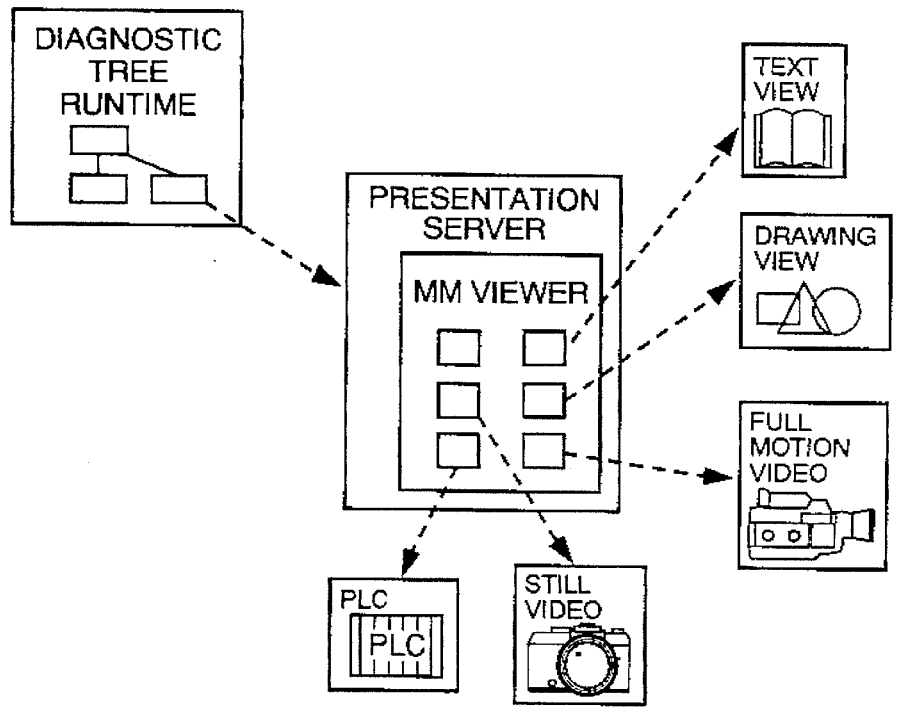
FIG. 6 is a schematic block diagram of a diagnostic tree and presentation server structure of the present invention.

The diagnostic system 20, the knowledge acquisition tool 24 and the database 22 are preferably incorporated in a software package called "Advisor" provided by Emerald Intelligence of Ann Arbor, Mich. Advisor provides the environment to build and execute diagnostics. To assign (i.e. map) and present (i.e. display) multimedia information for each of the diagnostic tree nodes as illustrated in FIG. 6, Advisor communicates and interacts with the presentation server 26. The presentation server 26 then communicates with the media specific software packages (i.e. Microsoft Word for documentation media) to select and view.

With this architecture, it is possible for each diagnostic node to have multimedia information assigned or mapped thereto thus improving the communication between the operator and the computer. The standard forms of multimedia utilized are: drawings, documentations, graphics, photographs, full motion video and audio, animation, sound, etc. For example, this approach can provide a better and easier means of on-line interactive repair and training procedures (i.e. by using full motion video) to the operator when a cause of the problem is determined. Also, because the architecture allows for the multimedia information to be used in its original format, there is no need to re-engineer the media information for it to be deliverable.

Based on this software architecture, there are two system utilities: the runtime solution or utility referred to as RUNTIME and the diagnostic tree building solution or utility referred to as BUILDER, as also described hereinbelow.

RUNTIME

Within the RUNTIME software there are two forms of executing the diagnostics: PLC directed or operator step-by-step operation. The PLC directed approach involves the computer receiving a predefined PLC fault code relative to a press malfunction. Once the PLC fault is recognized, the software jumps to a specific assigned location in the diagnostic tree (the same diagnostic process can be completed using the operator step-by-step approach, discussed below). The benefit of this approach is to minimize operator-to-computer diagnostic dialogue and get to the cause of the problem as quickly as possible. The key limitation of this approach is that it only applies to sensory faults. Non-sensory faults will need to be diagnosed in the step-by-step approach.

In either of the approaches (PLC directed or step-by-step), the operator is asked a series of questions until he reaches the cause of the press problem. In the step-by-step approach, the diagnostics always starts from the top of the tree. Answers for questions are presented in one of two formats: text or graphics with text. The text type answer is a traditional format illustrated in FIG. 7, and is the easiest to generate and least time-consuming. The graphics with text, as illustrated in FIG. 8, is a format that conveys the message faster and with less effort for the operator, but does take more development time because of the graphic development. Both of the answer formats can be intermixed in the diagnostics, but are defined and fixed in the diagnostic at the time of tree development.

Another important feature in both the Question & Answer formats is the placeholders. The placeholder reminds the operator of the path that has been chosen and allows the operator to "Back Up" to a previous diagnostic screen.

Figure 7:
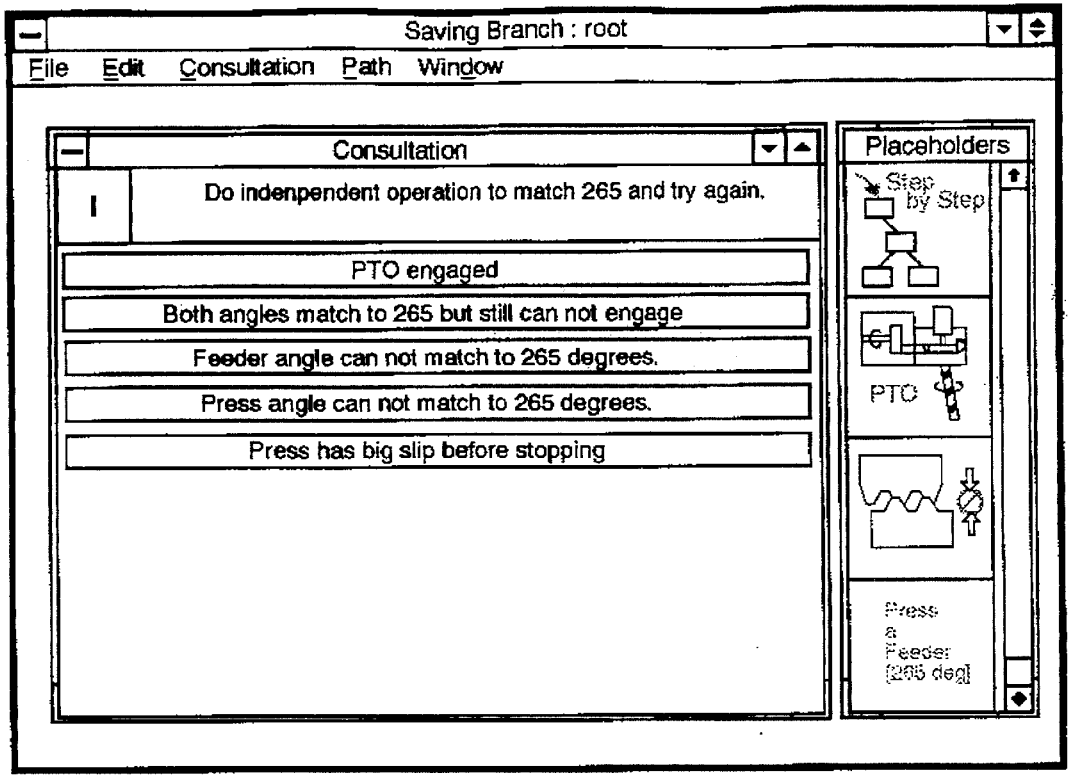
FIG. 7 is a schematic view of an example question and answer (Q and A) screen in text format.
Figure 8:
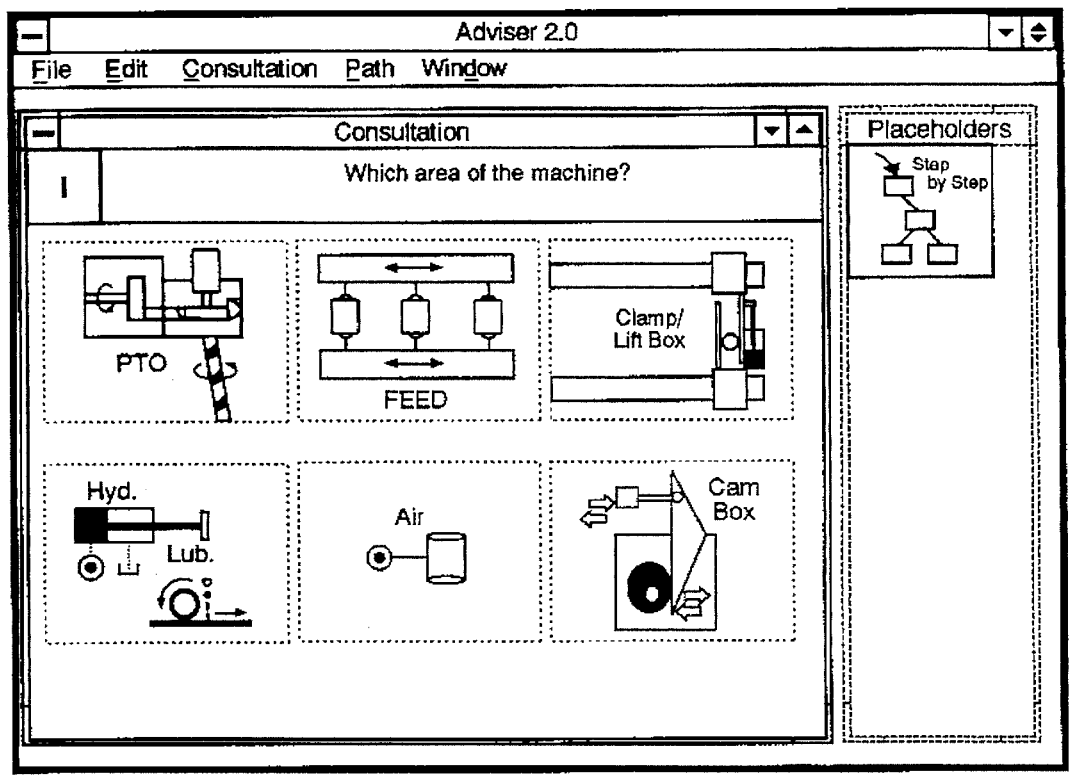
FIG. 8 is a schematic view of an example question and answer screen in graphics-with-text format.
Figure 9:
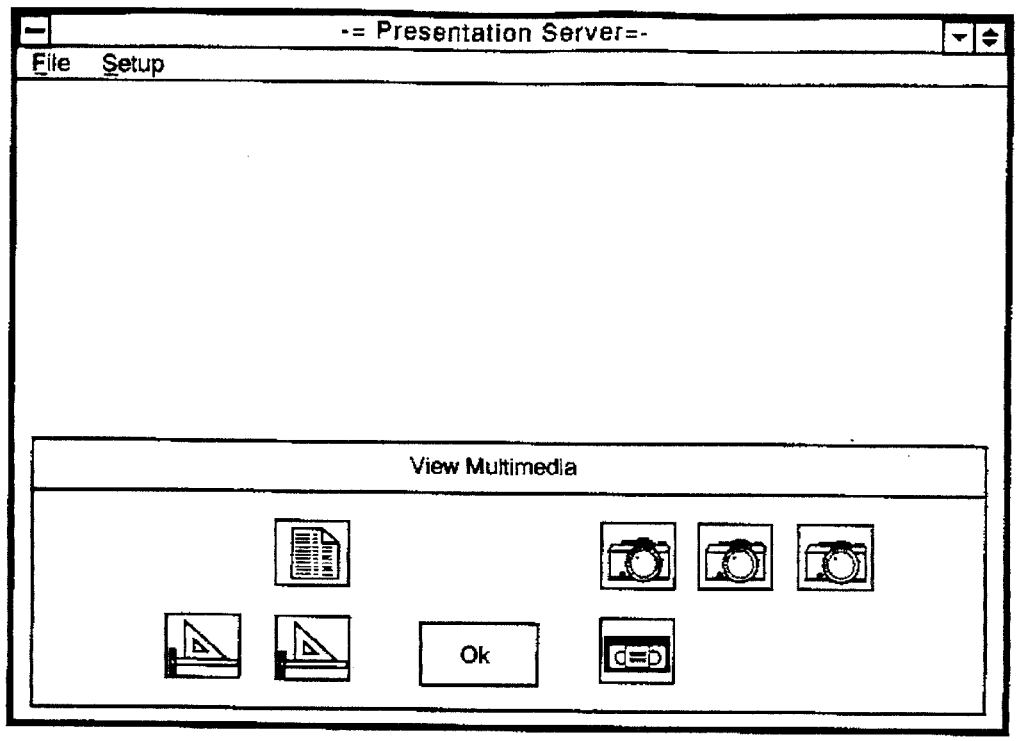
FIG. 9 is a schematic view of a presentation server screen.

Also, at any time during the diagnostic session, if related machine specific support information has been assigned to a particular question & answer or solution screen, an "i" button is displayed in the upper left hand corner as illustrated in FIGS. 7 and 8. By selecting the "i" button, the presentation server 26 is activated as illustrated in FIG. 9, which allows the operator to view the different assigned media relative to that node function in the form of multimedia commands. More detail on the use of the runtime solution is described hereinbelow.

BUILDER

BUILDER allows one to define and/or maintain machine diagnostic trees (a graphical representation of a diagnostic decision step or flow) and assign multimedia machine information to the respective tree node.

Figure 10:
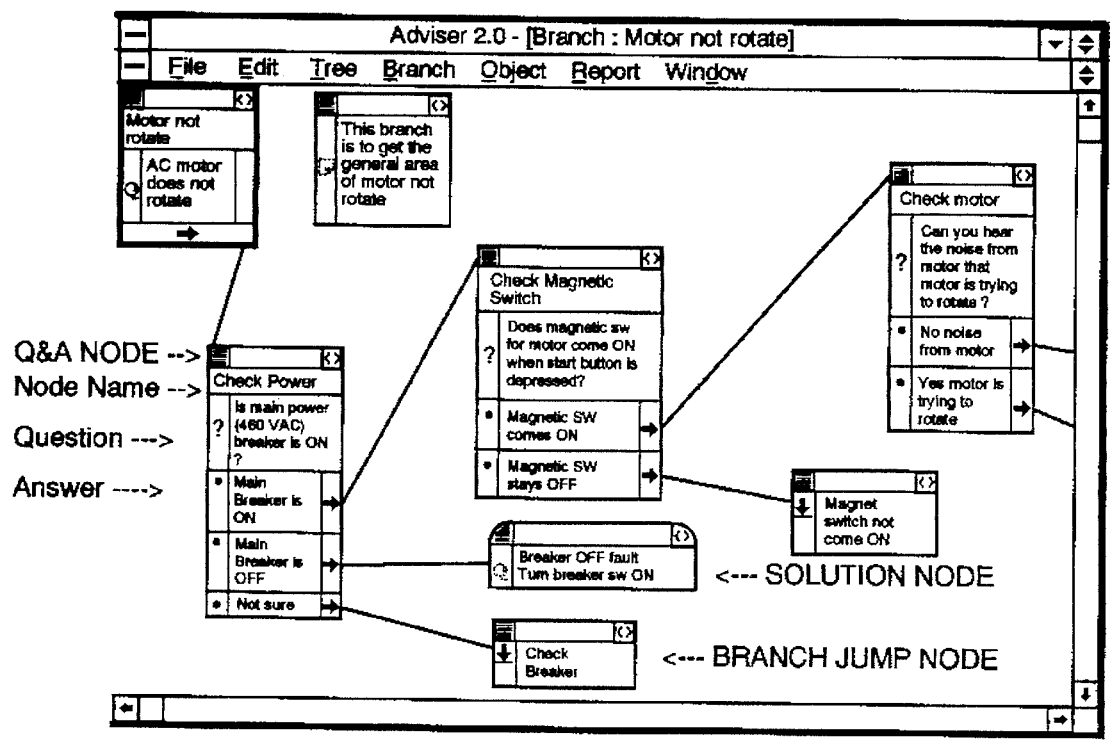
FIG. 10 is a schematic view of a diagnostic branch (edit) screen.

To briefly demonstrate the ease and simplicity of creating a diagnostic tree, reference may be made to FIG. 10. Diagnostic trees are made up of branches. Branches are made up of four primary components:

Question & Answer (Q&A) nodes

Solutions nodes

Branch jump nodes links or lines.

The Q&A node states a question with an unlimited number of answers. The solution node states the cause of the problem and needed repair for the cause of the problem. To assign a Q&A node (or solution node), a point mark is first located on the screen (click mouse) where one would like to place the node. Second, the type of node is selected from the above screen menu select: OBJECT-CREATE-SYMPTOM for Q&A node, or OBJECT-CREATE-SOLUTION for a solution node. This procedure places the object node on the screen as previously marked. To fill in the node name, the Q&A, or solution text information, the node is selected with the mouse pointer and the text is entered. Graphical answers with text can alternatively be used to replace the standard textual answers. To add more answers to a Q&A node, the node is selected and then OBJECT-ADD VALUE/TEST is selected from the menu screen. To link an answer to the next question or solution, a right arrow icon is selected in the preferred answer box then the mouse pointer is dragged to the respective question, branch or solution and the mouse button is released. This places a link or line between the two object nodes.

The above steps are repeated until the desired tree is built. Objects within a screen can freely be moved around, primarily for appearance and readability, without effecting the linking. Anytime while editing a tree, one can run the diagnostics by selecting from the screen menu, FILE-RUN TEST. This will bring one into the RUNTIME (test mode) with the current tree information.

Figure 11:
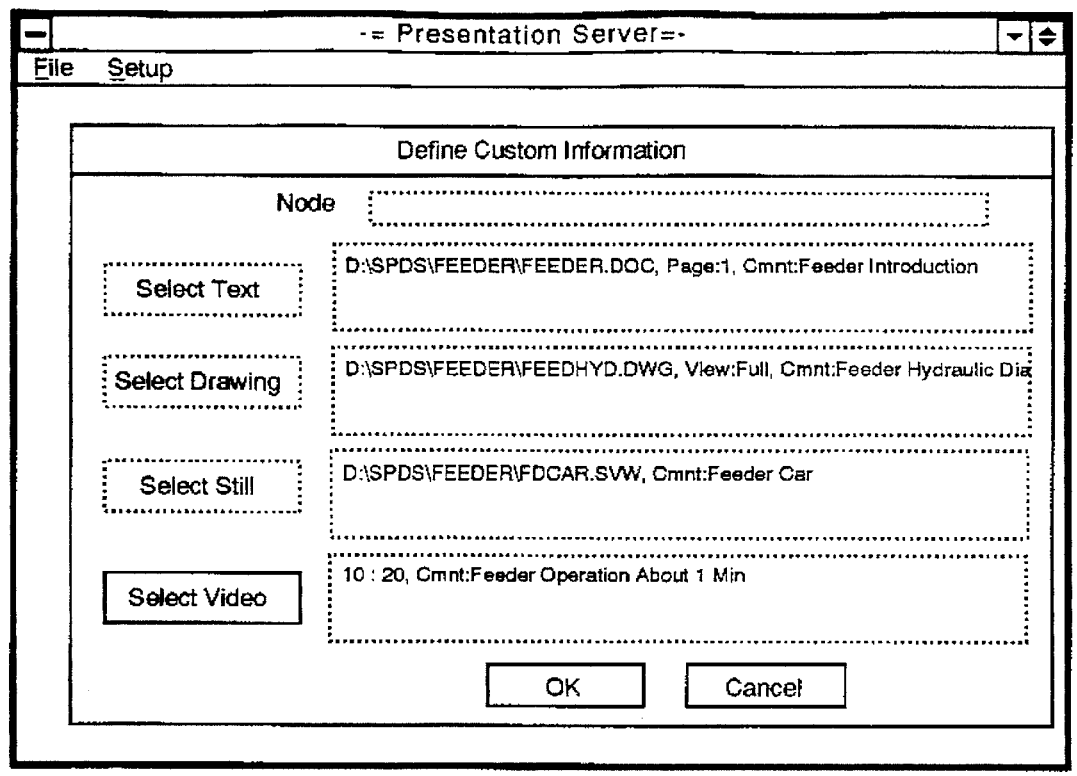
FIG. 11 is a graphical view of a presentation server edit screen or multimedia definition screen.

To define machine specific multimedia information for any of the Q&A and solution nodes, one needs to access the presentation server screen. First, one double click on "?" in the Q&A box or just on the solution box. This brings up the question or solution editor screen and then one enters CTRL and → keys, which brings up the presentation server (screen illustrated in FIG. 11). The keys do this by executing a recorded Windows 3.0 macro. To assign the desired media (documentation, drawing, photograph or video), the button on the left is selected. A file directory box (not shown) pops up to allow one to look up the hard disk for the desired file. Once the file is selected, there is an opportunity to preview the material, define required additional information (i.e. page number within a documentation) and assign comment information before mapping. When the media is selected, it is listed in the appropriate media box as illustrated in FIG. 11. There are, preferably, five different choices of material for each of the forms of media. When all the media is assigned, OK is entered to return to the builder screen.

Building Diagnostic Trees And Assigning Multimedia Information Using Graphic Icons The process here is similar to the above BUILDER process but is simpler to generate trees and assign multimedia information. There is also the use of more graphic icons (i.e. see the solution block of FIG. 12) instead of menu selections.

Figure 12:
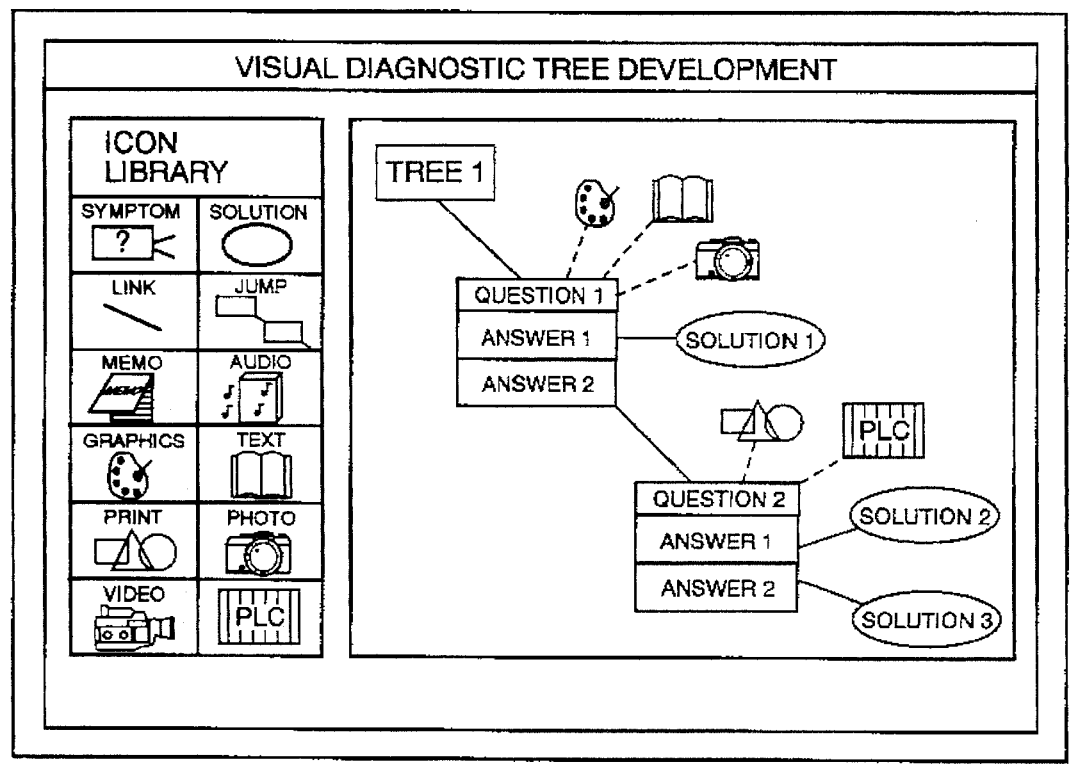
FIG. 12 is a graphical view of a screen illustrating diagnostic tree development with multimedia icon edit.

STEP 1:

To an assign symptom block (Q&A block) or solution block, an icon on the left in FIG. 12 is first selected, and located on the right side or work area of FIG. 12. To fill in the Q&A or solution block text information name, the block field with the mouse pointer is selected and the text is entered. To link an answer to the next question or solution, the link icon is selected and the respective blocks are connected. This places a link or line between the two blocks.

The above steps are repeated until the desired tree is built. Blocks within a screen can freely be moved around, primarily for appearance and readability, without effecting the linking.

The use of icons is a unique method for building diagnostic trees and defining multimedia information. Prior solutions required menu selections or involved accessing other screens.

Figure 13:
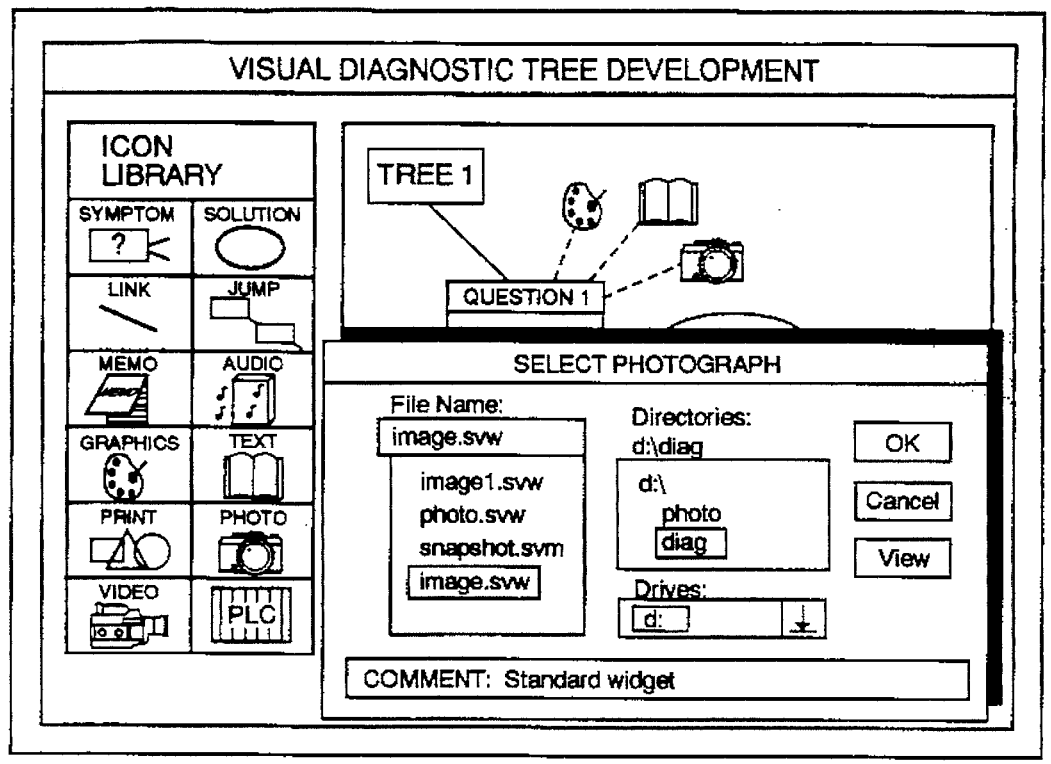
FIG. 13 is a graphical view of a media selection server.

STEP 2:

To define machine specific multimedia information for any of the Q&A and solution blocks, a media icon of choice is selected on the left side of the screen of FIG. 12. This media icon is placed near a Q&A or solution block of choice and is then linked to the desired block. By reselecting an assigned media icon on the right side, a media selection screen pops up as illustrated in FIG. 13. Once the file is selected, there is the opportunity to preview the material, define required additional information (i.e. page number within a documentation) and assign comment information before mapping.

This step is unique, because of the use of direct visual aids (icons) and programming to assign the media to its respective block. This process is simpler than prior solutions because everything is accomplished on one screen. The media remains in its natural format and does not require any re-engineering.

STARTUP

Figure 14:
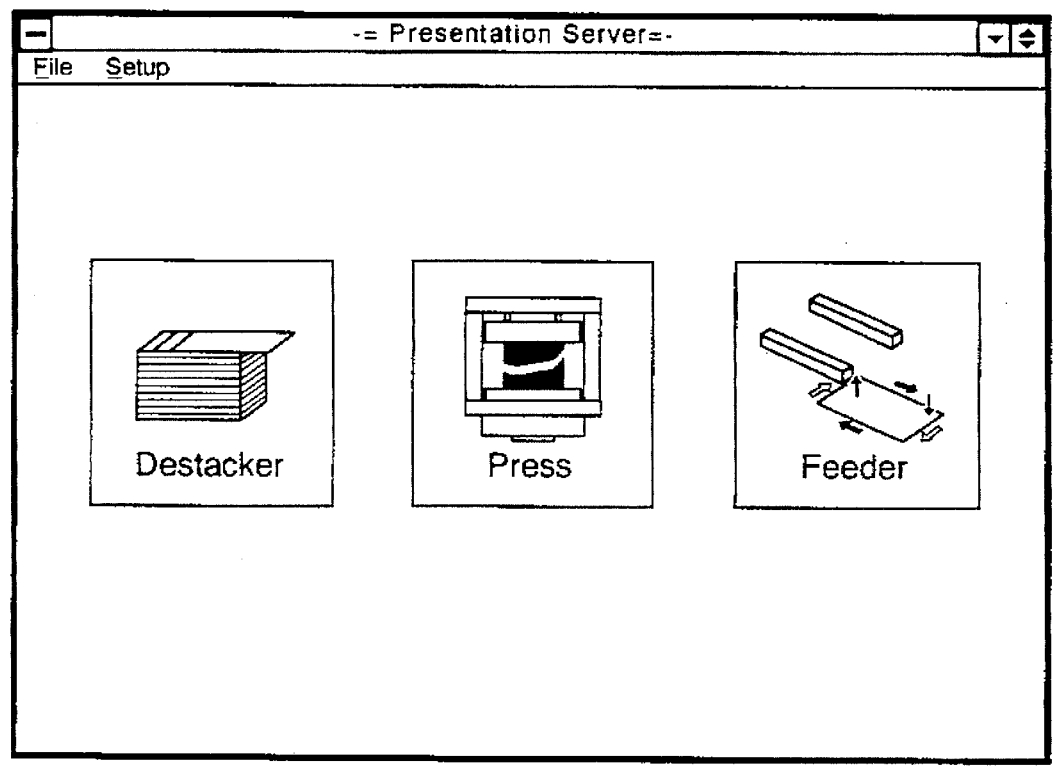
FIG. 14 is a graphical view of an initial application screen.

First one turns on the computer power or reboots the system. After a few minutes (software applications are being loaded), the first screen of the system as illustrated in FIG. 14 is displayed. This initial Question & Answer node is displayed on a tree display portion of the screen. This initial node requests one to select what transfer press subsystem (Feeder, Press or Destacker) has a problem. After selection in response to an initial command, additional Question & Answer screens are displayed until one reaches a solution screen or node. Details of each of the different types of screens and their operations are described hereinbelow.

QUESTION AND ANSWER SCREEN

Figure 15:
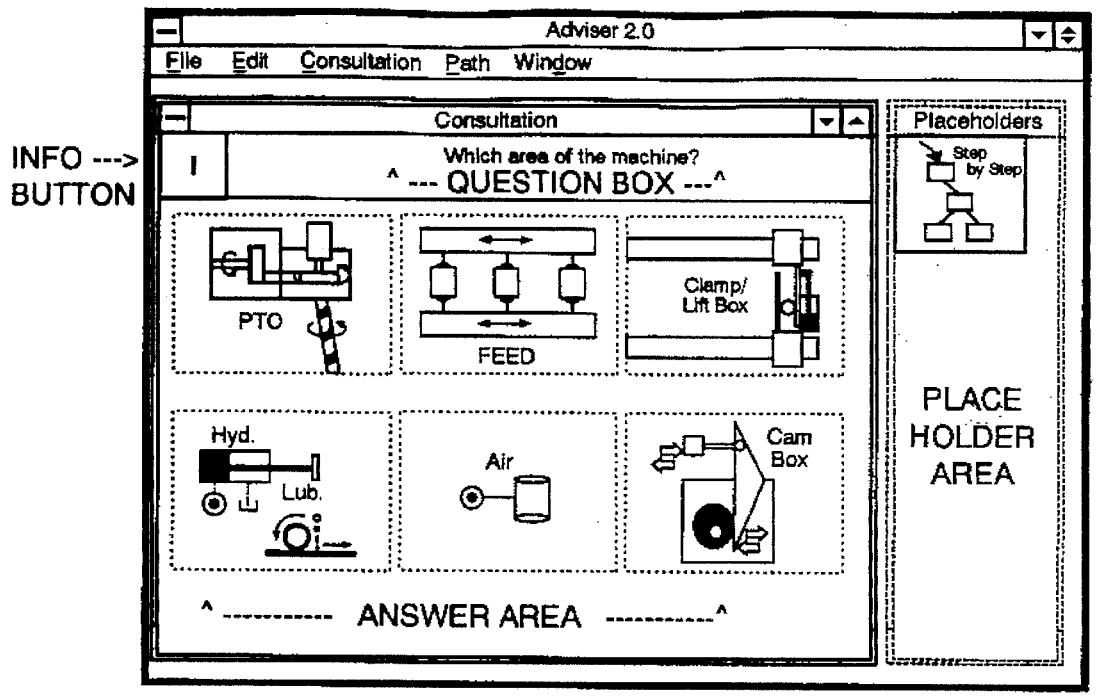
FIG. 15 is a graphical view of a standard Q and A screen similar to FIG. 8.

The diagnostic screen of FIG. 15 is an example of a Question & Answer (Q&A) screen. The standard Q&A screen is broken down into three major components: the question, the answer, and the placeholder. Also, in some of the Q&A screens, the Info Button is displayed, as highlighted in FIG. 15, which means that there is additional multimedia information defined with the question.

QUESTION BOX

For each diagnostic screen, there is a question posted and thus must be answered. The question is typically stated in text format only.

ANSWER AREA

In the answer area, there can be two types of answers: text or graphics with text as shown in FIG. 15. The next type is just a sentence as shown in FIG. 7. The graphics with text type shows a picture that represents the answer. To answer a question, the correct answer (line of text or picture) is selected.

PLACEHOLDER

Once an answer is selected, a box with a picture or text, is placed in the placeholder area or branch display portion of the tree display portion of the screen. These placeholder boxes represent the diagnostic path that has been taken. Selecting a placeholder box allows one to "BACKUP" to a previous diagnostic screen.

INFORMATION

By selecting the Info Button, "i", the multimedia presentation screen pops up, as shown in FIG. 9. This screen allows one to select desired media information (documentation, photographs, prints/drawings and full motion video) in response to the received user command. The multimedia information is there for the operator to help answer any questions or to explain testing or repair procedures about the current diagnostic screen.

View Screen For Text Document

Figure 17:
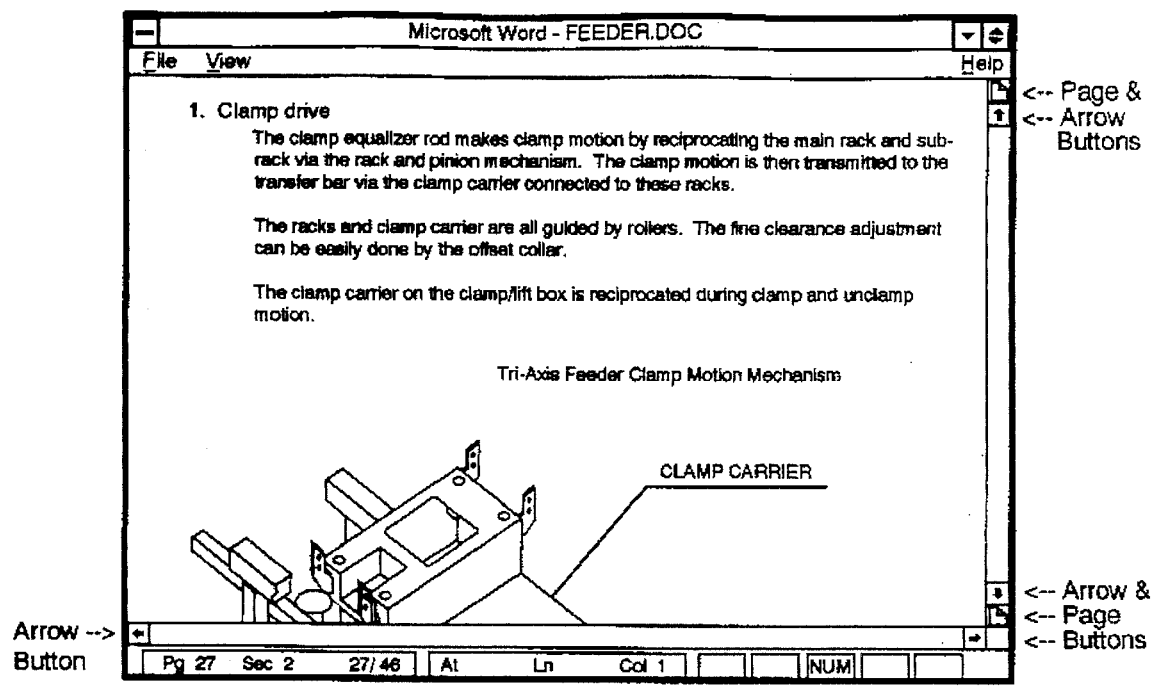
FIG. 17 is a graphical view of a documentation view screen.

The screen of FIG. 17 displays a text document, which can have embedded graphics, for a respective diagnostic screen. The whole page is not displayed. To view the other portions of the page, the arrow buttons (highlighted) are selected to move about the page. To look at the previous or next page within the document, the page symbol at the right hand side of the screen is selected (as highlighted). Finally, to exit and return back to the diagnostic screen "File" is selected from the menu and then "Done" is chosen from the "File Menu."

View Screen For Drawing

Figure 18:
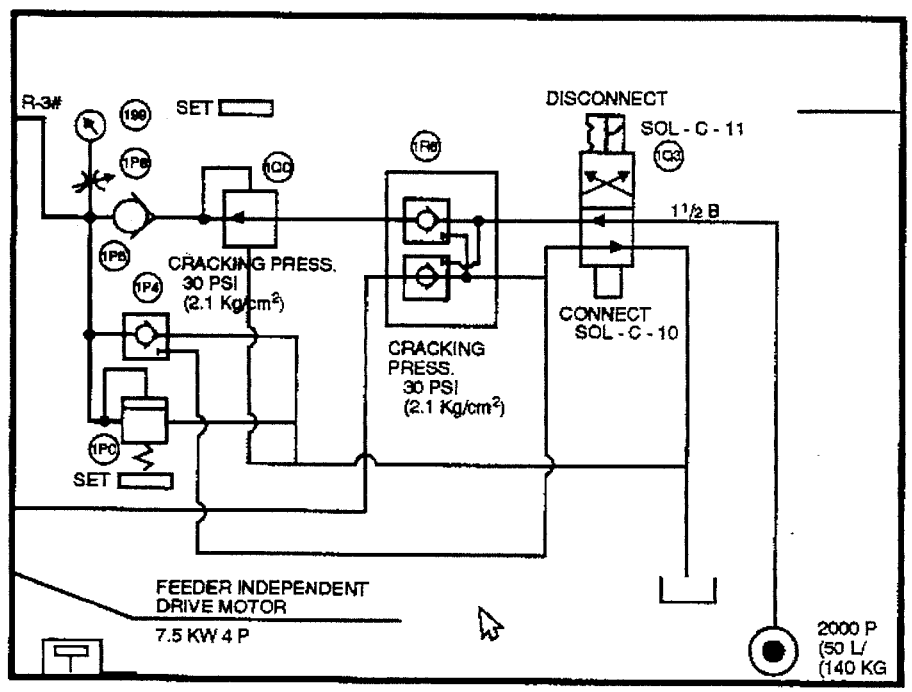
FIG. 18 is a graphical view of a screen for a drawing.

The screen of FIG. 18 displays an AutoCad drawing file (also called a print) and predefined views within an AutoCad file. These drawings can be an electrical, pneumatic, hydraulic or mechanical drawing. To exit the drawing, the screen is touched.

View Screen For Still Video

Figure 16:
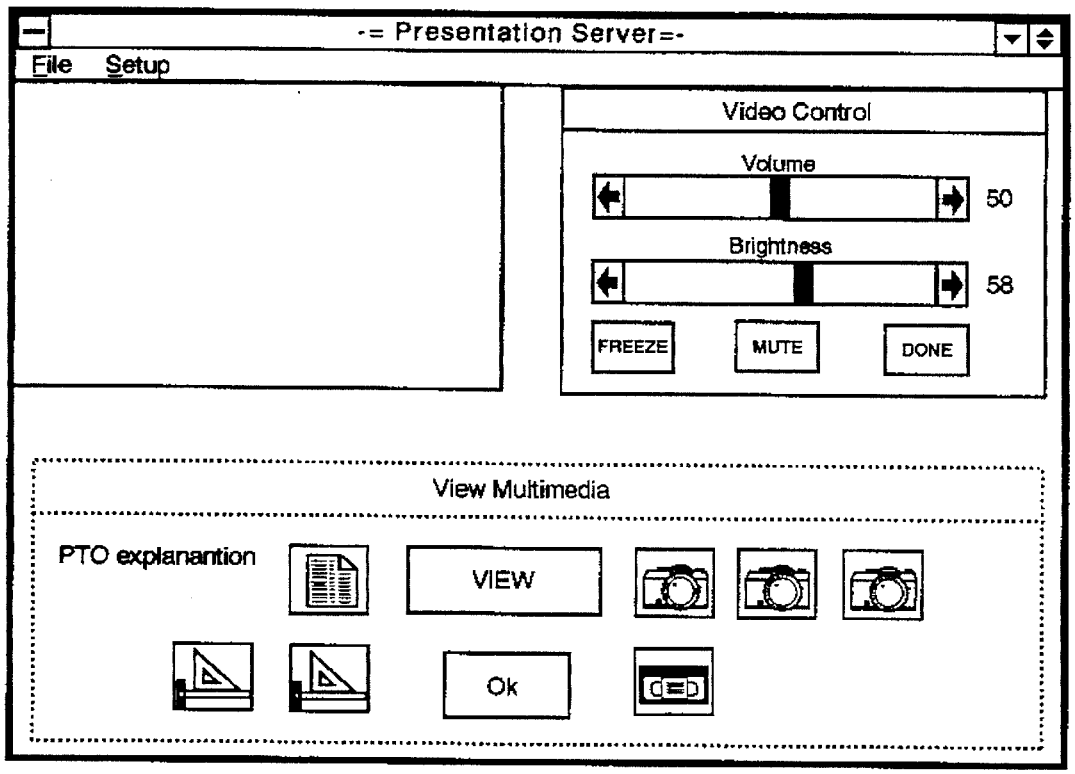
FIG. 16 is a graphical view of a multimedia view screen similar to FIG. 9 with video selected.
Figure 19:
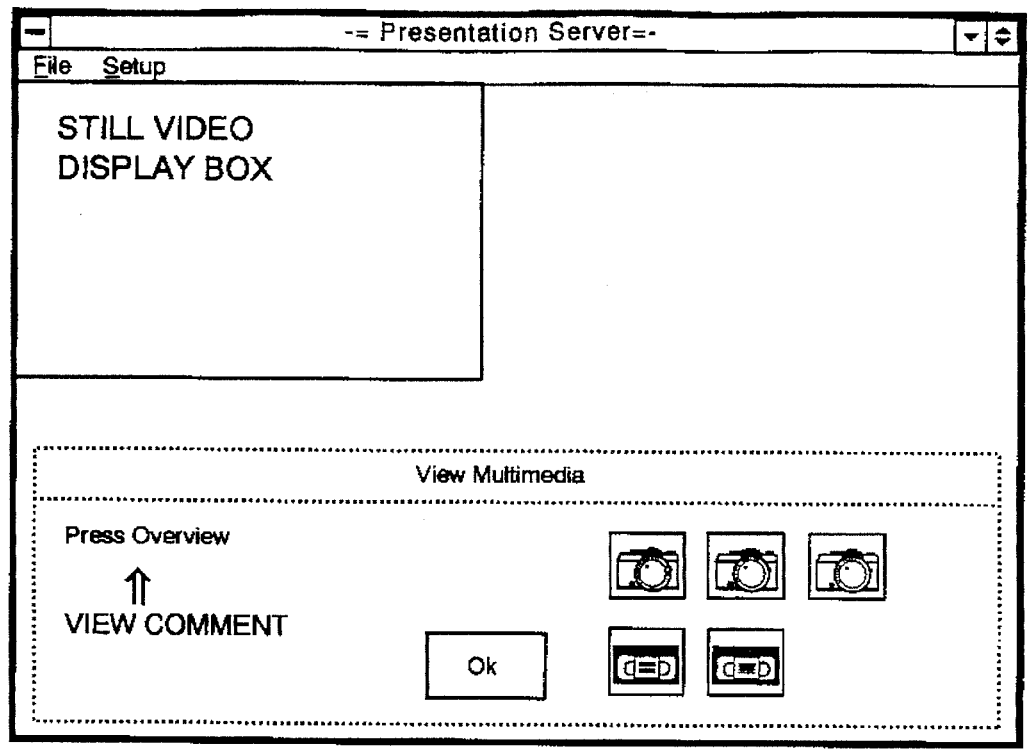
FIG. 19 is a graphical view of a screen for still video.

By selecting any of the still video (same as a photograph) buttons (the camera icon), the image is displayed in the top left side of the screen. An associated comment about the still video may be displayed above the still buttons as illustrated in FIGS. 16 and 19.

View Screen For Full Motion Video

Figure 20:
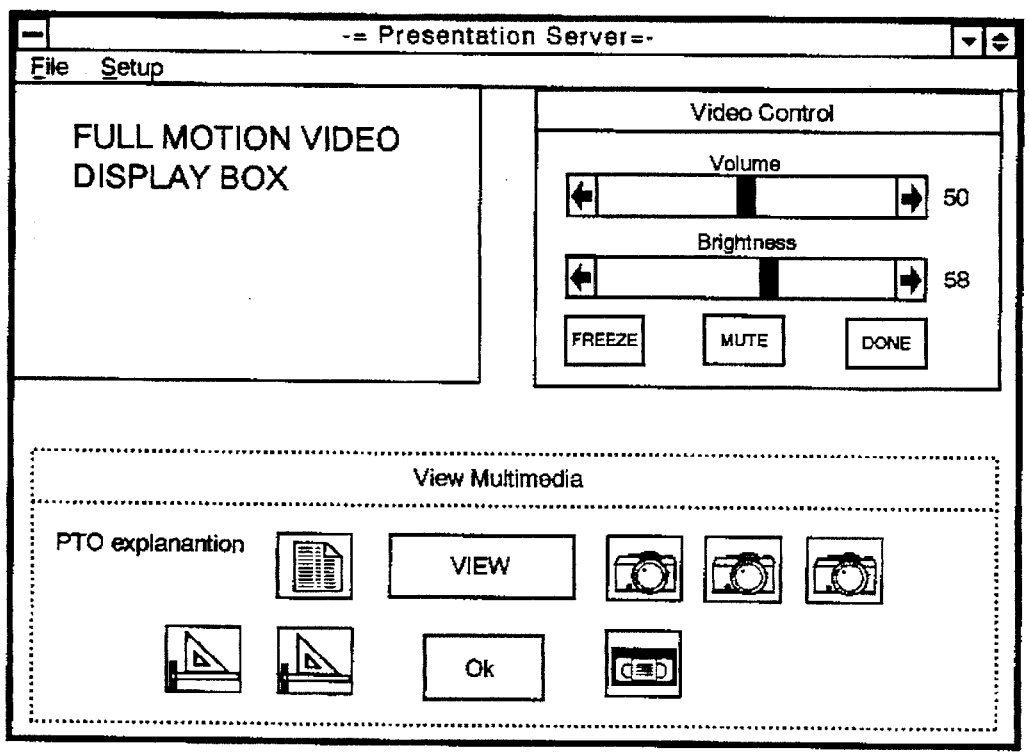
FIG. 20 is a graphical view of a screen for full motion values.

By selecting any of the full motion video buttons (the video tape icon), the video image is displayed in the top left side of the screen as illustrated in FIG. 20. Prior to displaying the video, a comment is displayed at the top of the box. This gives the operator the chance to determine if it is the right video to view. If not, another video button is selected. If it is the right video, the VIEW button is selected and the VCR will start searching for the tape segment under control of the computer. Once the video is found, it is displayed in the upper left side of the screen. Volume (if speakers are attached) and brightness can be adjusted while monitoring video tape. Two other video control buttons allow the audio to be muted and the video to be frozen (the VCR is still playing at this time and only the image on the screen is frozen). To exit once the video is completed, the DONE button is selected in the video control box.

Solution Screen

Figure 21:
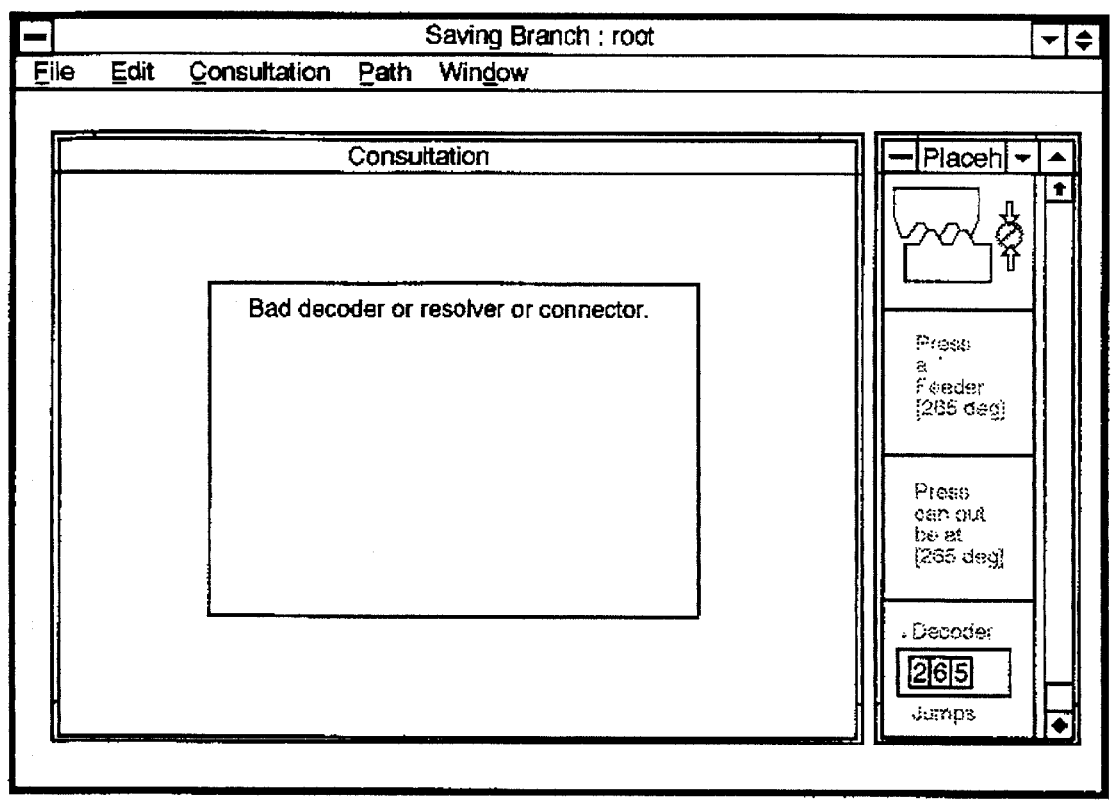
FIG. 21 is a graphical view of a solution screen.

When the last node, or the Solution, has been reached, the screen of FIG. 21 is displayed. If there is any help information assigned at this node, the help information is displayed first. At this point, one can still back up if needed or save this particular diagnostic session in a session file (*.SES).

To save session

To save current session from the top to current node, File-Save Session menu is selected. The appropriate file name is typed in. The default file extension is (*.SES).

To restore session

To restore a previously saved diagnostic session, File-Restore Session menu is selected. Then, the session file name is selected. By restoring session, one can trace the previous path or immediately return to the solution node.

The system as described herein below diagnoses three primary components of a machine tool such as a transfer press: the press, the feeder, and the destacker. The press and the feeder diagnostic trees and related information are included. The press and feeder trees may address as many as 143 primary symptoms that include approximately 800 nodes. Building these two trees and accumulating and assigning the multimedia information is relatively straight forward after the paper, drawings and documentation were converted into electronic format.

The method and system can be used to visually locate components on a large and complex transfer press. This has a significant impact in reducing the repair time because plant electricians can immediately locate defective component(s).

The method and system is not limited to stamping press diagnostics, but may be used for other forms of diagnostics (i.e. other plant machinery and office applications) and for use on non-machine diagnostics (i.e. process diagnostics or as engineering design aid).

The method and system provide the following advantages for use with a press: machine diagnostics when the machine is delivered; better transfer of technology and documentation from the vendor to the customer; reduced press down time; reduced diagnostic and repair time; better informed repair personnel, especially the apprentice; on-line training; better utilization of vendor/machine information; better service to the machine; the opportunity to capture new and refined diagnostic knowledge from plant personnel; reusability of information, that can be applied to other similar machines; and actual machine diagnostic flow and cause information can be captured to provide good feedback to the supplier with the hope of making better equipment and diagnostic models in the future.

The method and system can be used to provide a multi-lingual solution. Using a stereo VCR, one audio track may contain information in a first language and the other audio track may contain information in a second language. Further, a multi-lingual solution is made possible through the selection of alternate keyboard assignments using the windows operating environment.

The present system requires well disciplined and structured information management techniques to allow for ease of upgradeability, maintenance and adjustments. This process is also invisible and seamless to the people making these changes.

The presented media information demands high storage space but can be used for other similar and identical machines. To optimize storage and decrease redundancy of information, there may be a centralized network/file server solution. While there is currently no clean way to store, retrieve and transmit analog information (video and audio) over a data network, a complete centralized library of machine information such as 2 and 3 dimensional animation, multi-language media, audible answers to diagnostic questions, speech, 3-D drawings, and a point-to-point distribution system can be accommodated when such is possible.

While the best mode for carrying out the invention has been described in detail, those familiar with the art to which this invention relates will recognize various alternative designs and embodiments for practicing the invention as defined by the following claims.

We claim:

1. A method for processing and presenting multimedia diagnostic information as a diagnostic tree structure including branches having a plurality of nodes and node-connecting links in a computer system, the method comprising the steps of:

displaying multimedia diagnostic commands representative of various types of multimedia diagnostic information;

conveying multimedia diagnostic information to a user of the system;

storing a multiplicity of diagnostic information records mapped into the diagnostic tree structure, the diagnostic information records including:
  information records denoting the text strings to be displayed;
  information records denoting the multimedia commands to be displayed; and
  information records denoting the multimedia diagnostic information to be presented;

receiving an initial command;

displaying a graphical representation of a plurality of nodes including a question and answer node of the diagnostic tree structure including at least one text string in response to the initial command;

displaying a plurality of multimedia diagnostic commands corresponding to the question and answer node;

receiving a user command related to one of the displayed multimedia diagnostic commands; and presenting a selected amount of the multimedia diagnostic information to the user of the system in response to the user command.

2. The method as claimed in claim 1 wherein at least a portion of the multimedia information is stored in analog form.

3. The method as claimed in claim 1 wherein at least a portion of the multimedia information is stored in digital form.

4. The method as claimed in claim 1 wherein the at least one selected node is a question and answer node.

5. The method as claimed in claim 1 wherein the nodes of the tree structure include question and answer and branch jump nodes.

6. The method as claimed in claim 1 wherein the nodes of the tree structure include question and answer, branch jump and solution nodes.

7. The method as claimed in claim 1 wherein the multimedia information includes video images.

8. The method as claimed in claim 1 wherein the multimedia information includes sound messages.

9. The method as claimed in claim 1 wherein the multimedia information includes drawing images.

10. The method as claimed in claim 1 wherein the multimedia information includes graphical images.

11. The method as claimed in claim 1 wherein the multimedia information includes images of documents.

12. The method as claimed in claim 1 wherein a multiplicity of digitized video images is stored, each of the stored video images corresponding to one or more pieces of equipment from a predefined set of pieces of equipment.

13. The method as claimed in claim 1 wherein the multimedia commands are displayed in the form of graphic icons.

14. The method as claimed in claim 1 wherein the initial command is a user command.

15. The method as claimed in claim 1 wherein the selected nodes of the tree structure are displayed.

16. The method as claimed in claim 1 wherein the information records further include means for denoting graphical images to be displayed.

17. A system for processing and presenting multimedia diagnostic information as a diagnostic tree structure including branches having a plurality of nodes and node-connecting links in a computer system having tree display means for displaying a graphical representation of nodes of the tree structure, the system comprising:

command display means for displaying multimedia diagnostic commands representative of various types of multimedia diagnostic information;

multimedia output means for providing multimedia diagnostic information to a user of the system;

a knowledge base for storing a multiplicity of diagnostic information records mapped into the diagnostic tree structure, the diagnostic information records including:
information records denoting the text strings to be displayed on the tree display means;
information records denoting the multimedia commands to be displayed on the command display means; and
information records denoting the multimedia information to be presented by said multimedia output means;

means for receiving an initial command, the tree display means displaying a plurality of nodes including a question and answer node of the tree structure including at least one text string in response to the initial command, and the command display means displaying a plurality of multimedia diagnostic commands corresponding to the question and answer node on the command display means; and means for receiving a user command related to one of the displayed multimedia diagnostic commands, the multimedia output means presenting a selected amount of the multimedia diagnostic information to the user of the system in response to the user command.

18. The system as claimed in claim 17 wherein the knowledge base references at least a portion of the multimedia information stored in analog form.

19. The system as claimed in claim 17 wherein the knowledge base stores at least a portion of the multimedia information in digital form.

20. The system as claimed in claim 17 wherein the computer system is an expert computer system.

21. The system as claimed in claim 17 wherein the at least one selected node is a question and answer node.

22. The system as claimed in claim 17 wherein the nodes of the tree structure include question and answer and branch jump nodes.

23. The system as claimed in claim 17 wherein the nodes of the tree structure include question and answer, branch jump and solution nodes.

24. The system as claimed in claim 17 wherein the multimedia output means includes video display means for displaying video images.

25. The system as claimed in claim 17 wherein the multimedia output means includes sound generating means for generating sound messages.

26. The system as claimed in claim 17 wherein the multimedia output means includes drawing display means for displaying drawing images.

27. The system as claimed in claim 17 wherein the multimedia output means includes graphics display means for displaying graphical images.

28. The system as claimed in claim 17 wherein the multimedia output means includes document display means for displaying images of documents.

29. The system as claimed in claim 17 wherein the knowledge base stores a multiplicity of digitized video images, each of the stored video images corresponding to one or more pieces of equipment from a predefined set of pieces of equipment.

30. The system as claimed in claim 17 wherein the multimedia commands are displayed on the command display means in the form of graphic icons.

31. The system as claimed in claim 17 wherein the initial command is a user command.

32. The system as claimed in claim 17 wherein the tree display means, the command display means and the multimedia output means define a video display of the computer system.

33. The system as claimed in claim 17 wherein the tree display means includes branch display means for displaying the selected nodes of the tree structure.

34. The system as claimed in claim 17 wherein the information records further include means for denoting graphical images that can be displayed on the tree display means.

35. A method for creating a diagnostic tree structure for processing and presenting multimedia diagnostic information, said tree structure including branches having a plurality of nodes and node-connecting links in a computer system, the method comprising the steps of:

displaying multimedia diagnostic commands representative of various types of the multimedia diagnostic information;

providing the multimedia diagnostic information to the system;

inputing the multimedia diagnostic information to the computer system;

storing the multimedia diagnostic information;

storing a multiplicity of diagnostic information records mapped into the diagnostic tree structure having a plurality of nodes including a question and answer node, the diagnostic information records including:
information records denoting text strings to be graphically displayed;
information records denoting multimedia commands to be displayed; and
information records denoting the multimedia diagnostic information to be presented; and assigning the stored multimedia diagnostic information to one or more of the diagnostic information records.

36. A system for creating a diagnostic tree structure for processing and presenting multimedia diagnostic information, said tree structure including branches having a plurality of nodes and node-connecting links in a computer system having tree display means for displaying a graphical representation of nodes of the tree structure, the system comprising:

a computer system, the computer system including:
command display means for displaying multimedia diagnostic commands representative of various types of the multimedia diagnostic information;
multimedia output means for providing the multimedia diagnostic information to a user of the system;
multimedia input means for providing the multimedia diagnostic information to the system;
multimedia storage means for storing the multimedia diagnostic information in the form of a knowledge base, the knowledge base storing a multiplicity of diagnostic information records mapped into the diagnostic tree structure having a plurality of nodes including a question and answer node, the diagnostic information records including:
information records denoting text strings to be graphically displayed on the tree display means;
information records denoting multimedia commands to be displayed on the command display means; and
information records denoting the multimedia information to be presented by said multimedia output means; and means for assigning said stored multimedia diagnostic information to at least one information record.

\* \* \* \* \*